(12) United States Patent
Garry (10) Patent No.: US 8,707,706 B2
(45) Date of Patent: Apr. 29, 2014

(54) COMBUSTION CHAMBER

(75) Inventor: Ian M. Garry, Thurcaston (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/549,830

(22) Filed: Jul. 16, 2012

(65) Prior Publication Data

US 2013/0031904 A1 Feb. 7, 2013

(30) Foreign Application Priority Data

Aug. 2, 2011 (GB) .................................. 1113249.5

(51) Int. Cl.
*F02C 1/00* (2006.01)

(52) U.S. Cl.
USPC ............................................. 60/752; 60/804

(58) Field of Classification Search
USPC ........................................... 60/751–760, 804
See application file for complete search history.

(56) References Cited

U.S. PATENT DOCUMENTS

| 2,699,648 | A | * | 1/1955 | Berkey ............................ 60/756 |
| 3,496,722 | A | * | 2/1970 | Robins et al. .................. 60/757 |
| 4,688,310 | A |   | 8/1987 | Kelm et al. |
| 5,501,071 | A | * | 3/1996 | Ansart et al. .................. 60/800 |

FOREIGN PATENT DOCUMENTS

| GB | 2 074 308 A | 10/1981 |
| GB | 2 087 065 A | 5/1982 |
| GB | 2 179 276 A | 3/1987 |

OTHER PUBLICATIONS

Nov. 25, 2011 Search Report issued in British Patent Application No. GB1113249.5.

* cited by examiner

*Primary Examiner* — Phutthiwat Wongwian
(74) *Attorney, Agent, or Firm* — Oliff PLC (57) ABSTRACT

A combustion chamber includes at least one annular wall. The annular wall includes a plurality of segments and each segment has a first portion, a second portion and a third portion. The first portion of each segment extends circumferentially, the third portion of each segment extends circumferentially and the second portion of each segment extends radially to connect the first portion and third portion of the segment. The segments are arranged such that the first portion of each segment overlaps the third portion of an adjacent segment and the first portion of each segment is bolted to the third portion of the adjacent segment. The segments are cast and define a double wall combustion chamber and enable easier construction of the combustion chamber and replacement of damaged segments.

26 Claims, 5 Drawing Sheets

COMBUSTION CHAMBER

BACKGROUND

The present invention relates to a combustion chamber and in particular to a gas turbine engine combustion chamber.

Conventionally an annular combustion chamber comprises an inner annular wall secured to an upstream end wall and an outer annular wall secured to the upstream end wall. The upstream end wall is conventionally formed by casting and machining. The inner and outer annular walls are conventionally formed by machining ring rolled forgings. Tiles are secured to the inner and outer walls and heat shields are secured to the upstream end wall.

The conventional method of manufacturing an annular combustion chamber is expensive and has long lead times. The conventional method of manufacturing an annular combustion chamber requires many different manufacturing techniques, e.g. casting, forging, rolling, machining and welding etc.

Accordingly the present invention seeks to provide a novel combustion chamber which reduces, preferably overcomes, the above mentioned problems.

BRIEF SUMMARY

Accordingly the present invention provides a combustion chamber comprising at least one annular wall, the annular wall comprising a plurality of segments, each segment having a first portion, a second portion and a third portion, the first portion of each segment extending circumferentially, the third portion of each segment extending circumferentially and the second portion of each segment extending radially to connect the first portion and third portion of the segment, the segments being arranged such that the first portion of each segment overlaps the third portion of an adjacent segment and the first portion of each segment is joined to the third portion of the adjacent segment.

The second portion of each segment may extend circumferentially and radially,

The first portion of each segment may be spaced radially from the third portion of the adjacent segment to form at least one chamber and the chamber is arranged to be supplied with a coolant.

The segment may be arranged such that the first portion of each segment is arranged radially outwardly of the third portion of the adjacent segment.

The third portion of each segment may have at least one radially outwardly extending stud arranged to locate in a corresponding aperture in the first portion of the adjacent segment to join the segments together.

The third portion of each segment may have a plurality of radially outwardly extending studs arranged to locate in a corresponding aperture of a plurality of apertures in the first portion of the adjacent segment to join the segments together.

The studs may be threaded into nuts at the radially outer surface of the first portion of the adjacent segment.

The first portion of each segment may have at least one dilution aperture aligned with a corresponding dilution aperture in the third portion of the adjacent segment.

The first portion of each segment may have a plurality of cooling holes arranged to supply coolant to the at least one chamber defined between the first portion and the third portion of the adjacent segment.

The plurality of cooling holes may be arranged to impinge the coolant upon a radially outer surface of the third portion of the adjacent segment.

The third portion of each segment may have a plurality of effusion cooling apertures to provide a film of coolant on a radially inner surface of the third portion of each segment.

The third portion of each segment may have a thermal barrier coating on a radially inner surface.

The segment may be arranged such that the first portion of each segment is arranged radially inwardly of the third portion of the adjacent segment.

The third portion of each segment may have at least one radially inwardly extending stud arranged to locate in a corresponding aperture in the first portion of the adjacent segment to join the segments together.

The third portion of each segment may have a plurality of radially inwardly extending studs arranged to locate in a corresponding aperture of a plurality of apertures in the first portion of the adjacent segment to join the segments together.

The studs may be threaded into nuts at the radially inner surface of the first portion of the adjacent segment.

The first portion of each segment may have at least one dilution aperture aligned with a corresponding dilution aperture in the third portion of the adjacent segment.

The first portion of each segment may have a plurality of cooling holes arranged to supply coolant to the at least one chamber defined between the first portion and the third portion of the adjacent segment.

The plurality of cooling holes may be arranged to impinge the coolant upon a radially inner surface of the third portion of the adjacent segment.

The third portion of each segment may have a plurality of effusion cooling apertures to provide a film of coolant on a radially outer surface of the third portion of each segment.

The third portion of each segment may have a thermal barrier coating on a radially outer surface.

The first portion, the second portion and the third portion of each segment may be formed integrally. At least one of the segments may be a casting. Each of the segments may comprise a casting. Each of the segments may be formed by direct laser deposition or selected laser sintering.

The combustion chamber may be a tubular combustion chamber and the at least one wall is a tubular wall.

The combustion chamber may be an annular combustion chamber and the at least one wall may be a radially outer annular wall or a radially inner annular wall.

The combustion chamber may be a gas turbine engine combustion chamber.

The present invention will be more fully described by way of example with reference to the accompanying drawings, in which:—

DETAILED DESCRIPTION

Figure 1:
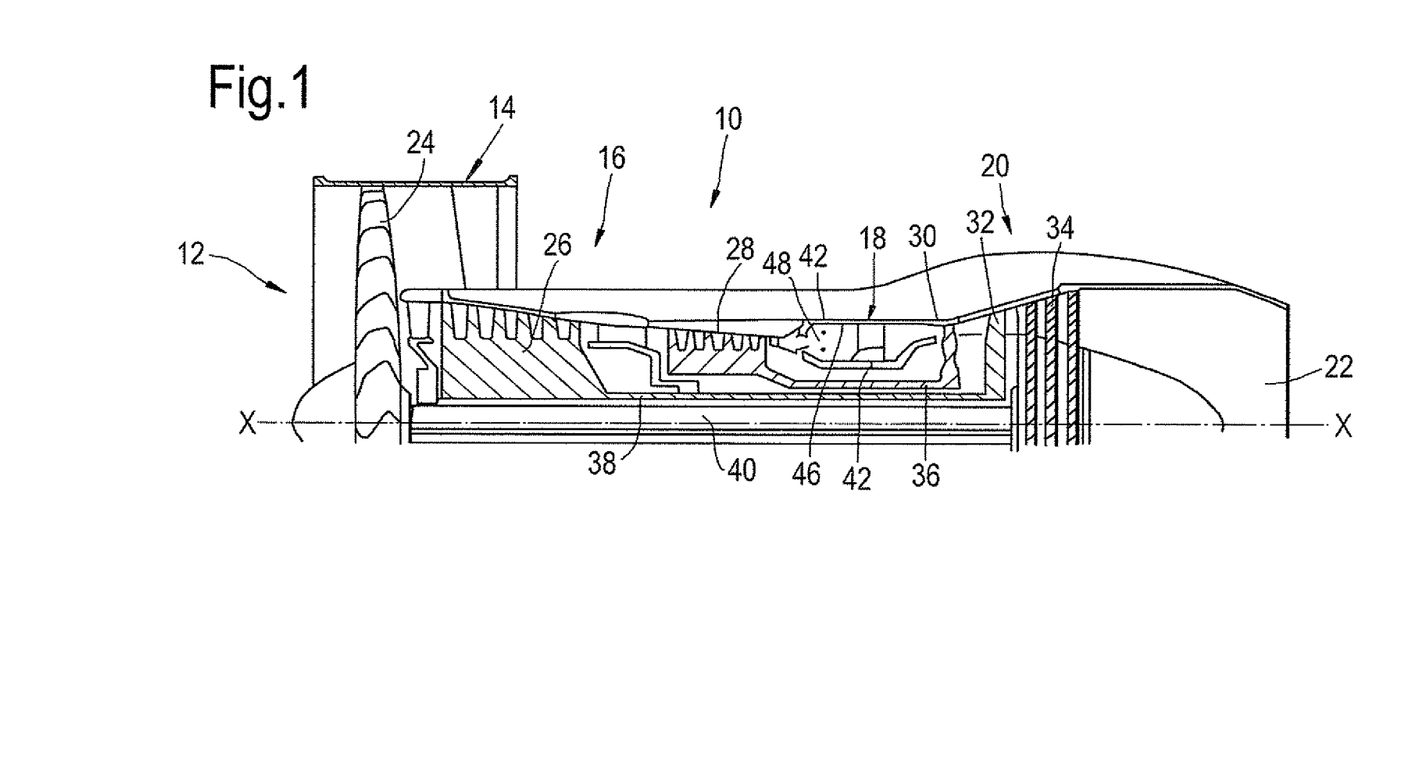
FIG. 1 is a cross-sectional view through a turbofan gas turbine engine having an annular combustion chamber according to the present invention.

A turbofan gas turbine engine 10, as shown in FIG. 1, comprises in flow series an inlet 12, a fan section 14, a compressor section 16, a combustion section 18, a turbine section 20 and an exhaust 22. The fan section 14 comprises a fan 24. The compressor section 16 comprises in flow series an intermediate pressure compressor 26 and a high pressure compressor 28. The turbine section 20 comprises in flow series a high pressure turbine 30, an intermediate pressure turbine 32 and a low pressure turbine 34. The fan 24 is driven by the low pressure turbine 34 via a shaft 40. The intermediate pressure compressor 26 is driven by the intermediate pressure turbine 32 via a shaft 38 and the high pressure compressor 28 is driven by the high pressure turbine 30 via a shaft 36. The turbofan gas turbine engine 10 operates quite conventionally and its operation will not be discussed further. The turbofan gas turbine engine 10 has a rotational axis X.

Figure 2:
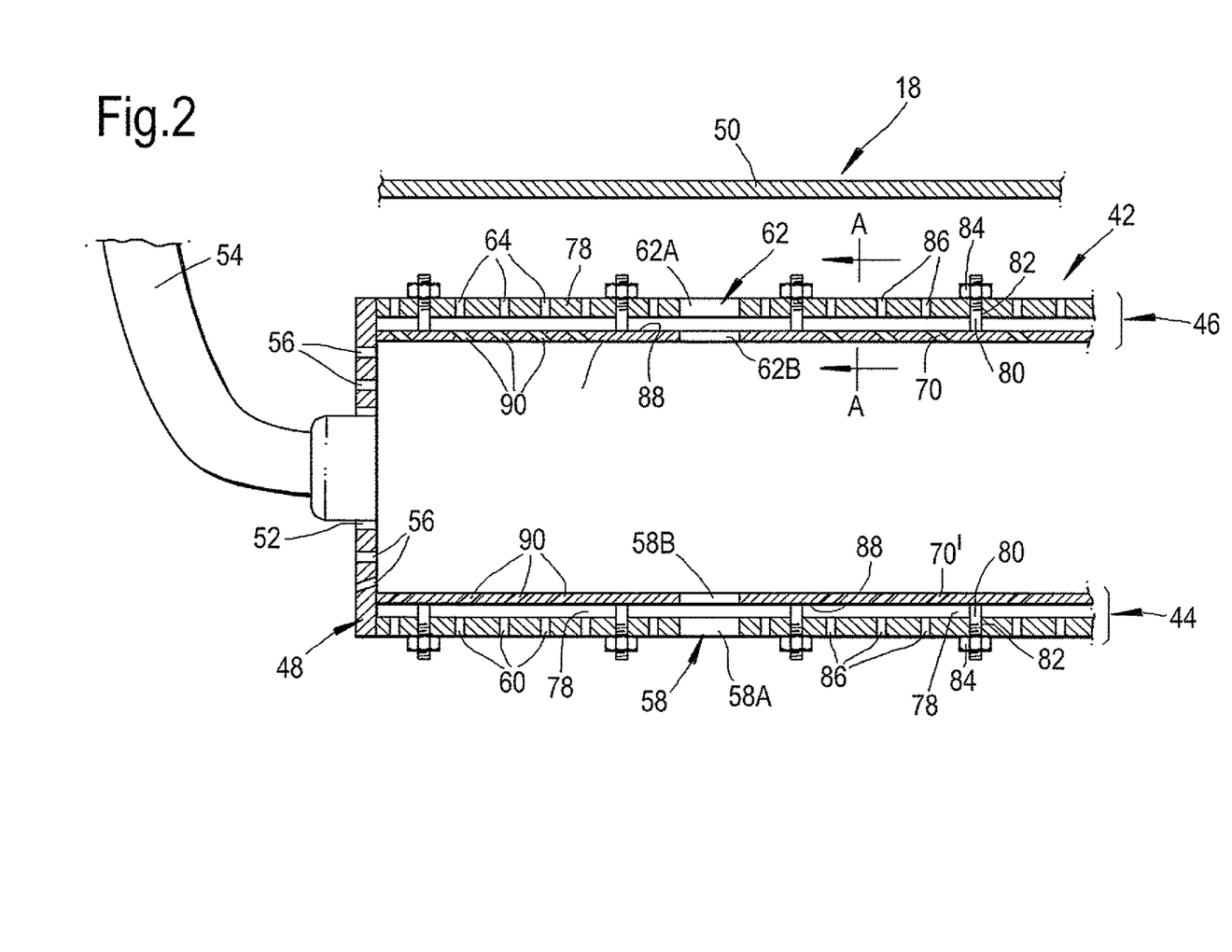
FIG. 2 is an enlarged cross-sectional view through an annular combustion chamber according to the present invention.

The combustion section 18 comprises an annular combustion chamber 42, which is shown more clearly in FIG. 2. The annular combustion chamber 42 has a radially inner annular wall 44, a radially outer annular wall 46 and an upstream end wall 48 connecting the upstream ends of the radially inner annular wall 44 and the radially outer annular wall 46. The annular combustion chamber 42 is surrounded by a casing 50. The upstream end wall 48 has a plurality of circumferentially spaced fuel injector apertures 52 and each fuel injector aperture 52 has a respective one of a plurality of fuel injectors 54. The upstream end wall 48 also has a plurality of smaller diameter cooling apertures 56 through which a flow of coolant is arranged to flow in operation. The radially inner annular wall 44 has a plurality of circumferentially spaced dilution apertures 58 through which a flow of dilution air is arranged to flow into the annular combustion chamber 42 in operation. The radially inner annular wall 44 also has a plurality of smaller diameter cooling apertures 60 through which a flow of coolant is arranged to flow in operation. The radially outer annular wall 46 has a plurality of circumferentially spaced dilution apertures 62 through which a flow of dilution air is arranged to flow into the annular combustion chamber 42 in operation. The radially outer annular wall 46 also has a plurality of smaller diameter cooling apertures 64 through which a flow of coolant is arranged to flow in operation.

Figure 3:
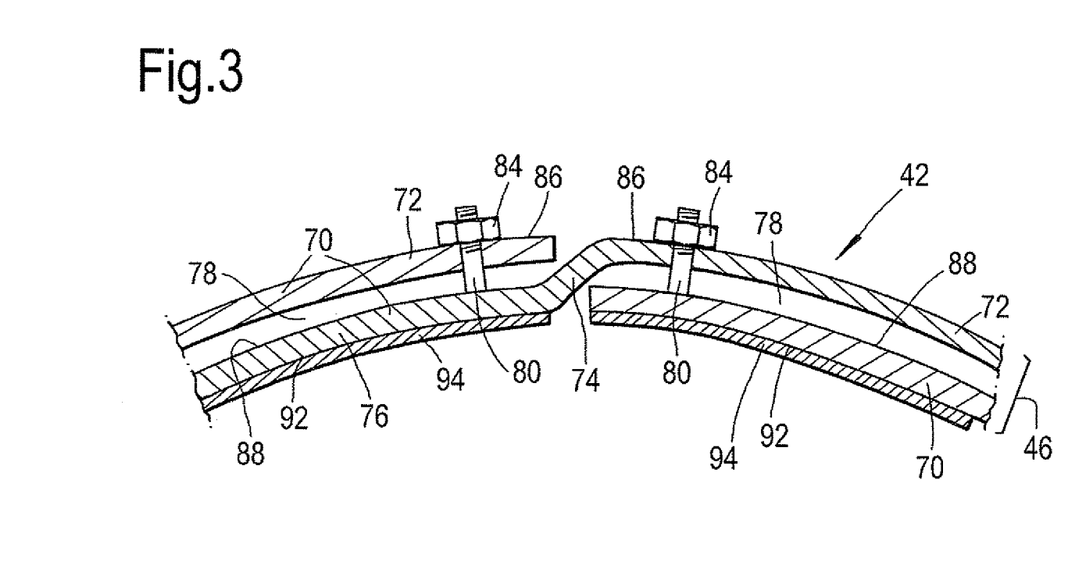
FIG. 3 is a cross-sectional view along line A-A in FIG. 2.
Figure 4:
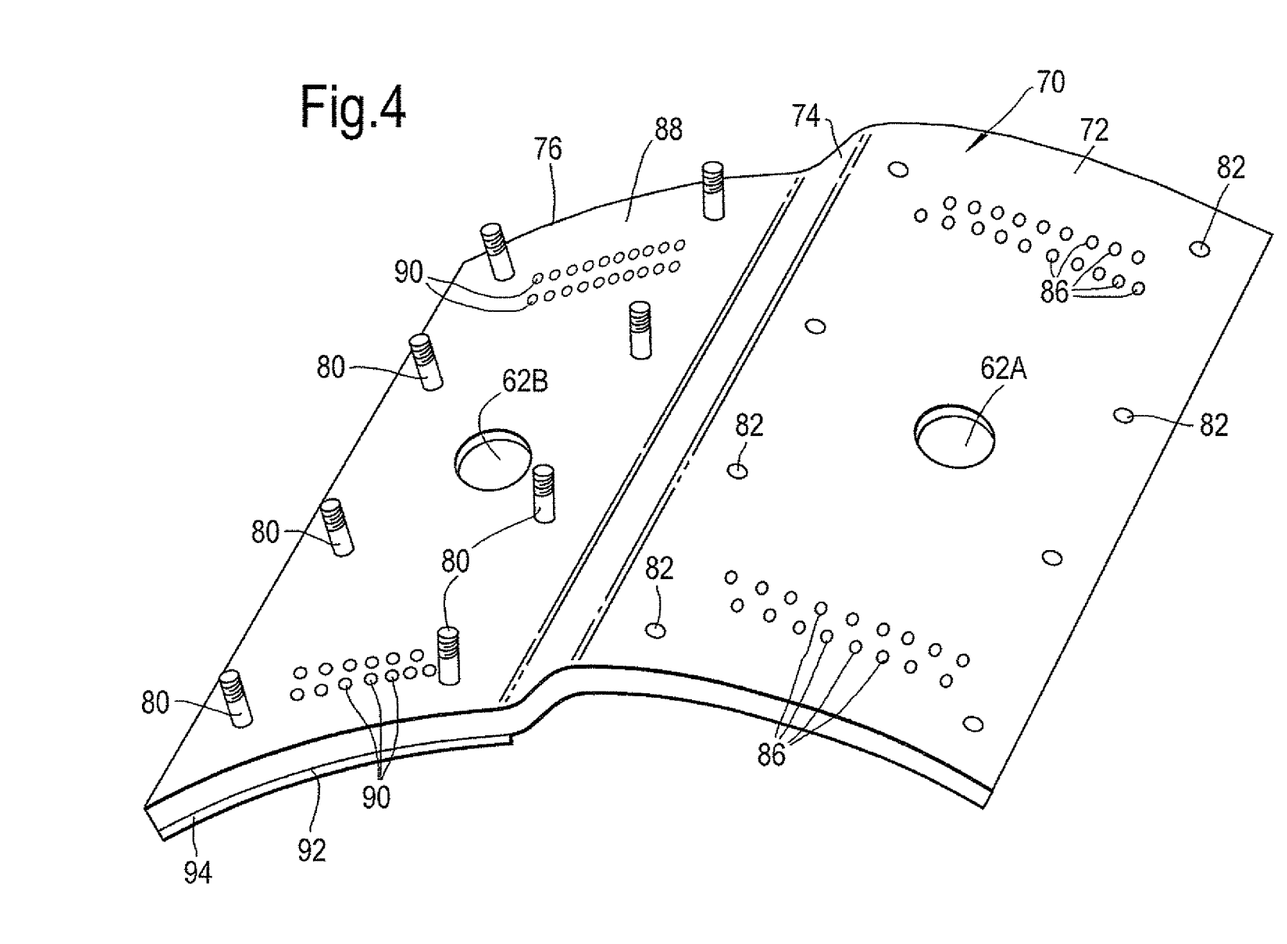
FIG. 4 is an enlarged perspective view of a single segment of a radially outer annular wall of the annular combustion shown in FIG. 2.
Figure 5:
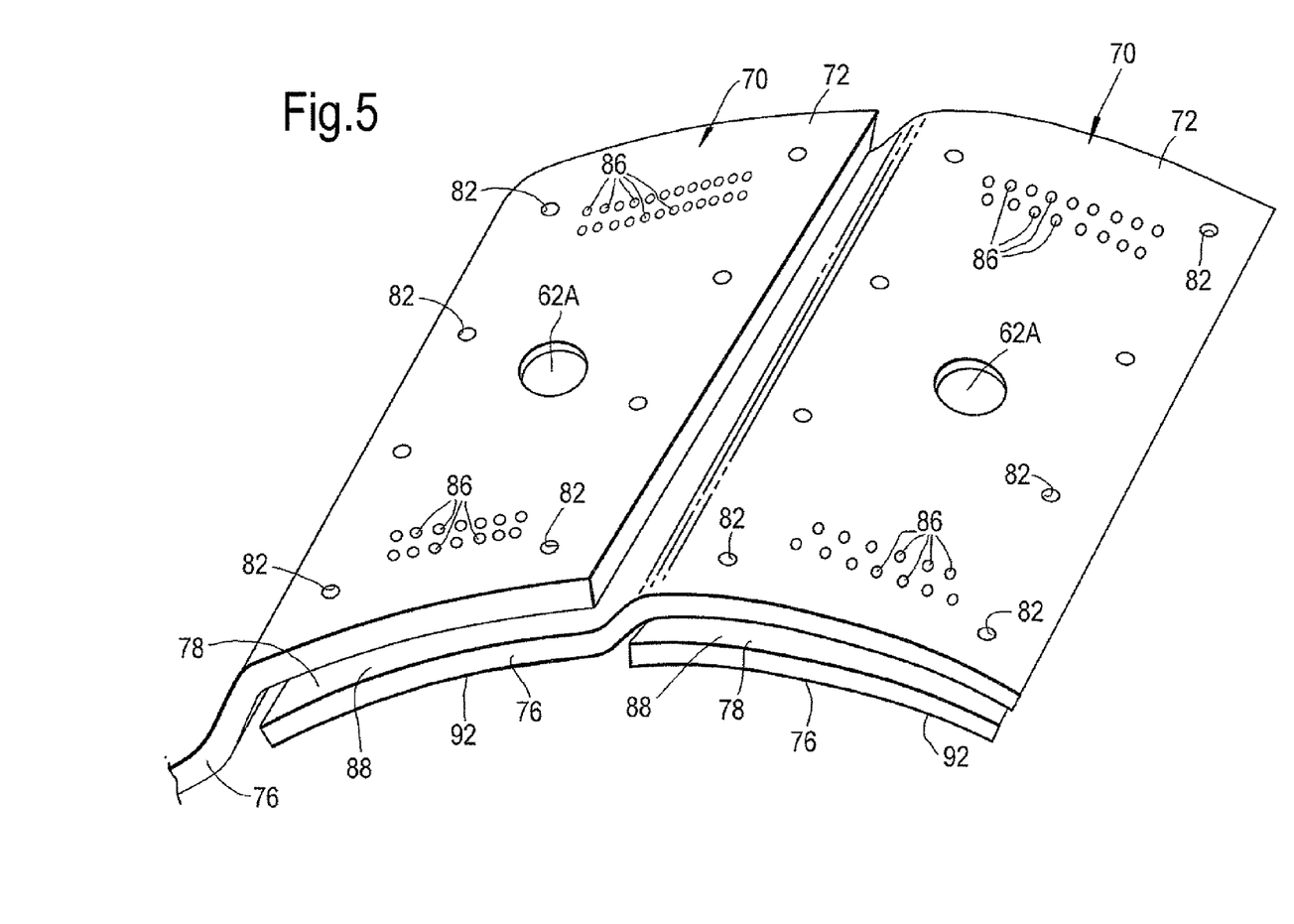
FIG. 5 is an enlarged perspective view of a pair of adjacent segments of a radially outer annular wall of the annular combustion chamber shown in FIG. 2.

The radially inner annular wall 44 and the radially outer annular wall 46 each comprise a plurality of segments 70 and 70' respectively, as seen more clearly in FIGS. 3, 4 and 5. Each segment 70, 70' comprises a first portion 72, a second portion 74 and a third portion 76. The first portion 72 of each segment 70 extends circumferentially, the third portion 76 of each segment 70, 70' extends circumferentially and the second portion 74 of each segment 70, 70' extends radially to connect the first portion 72 and third portion 76 of the segment 70, 70' together. The segments 70, 70' are arranged such that the first portion 72 of each segment 70, 70' overlaps the third portion 76 of an adjacent segment 70, 70' and the first portion 72 of each segment 70, 70' is joined to the third portion 76 of the adjacent segment 70, 70'. The second portion 74 of each segment 70, 70' in fact extends circumferentially and radially in this example as shown in FIGS. 3, 4 and 5. The first portion 72 of each segment 70, 70' is spaced radially from the third portion 76 of the adjacent segment 70, 70' to form at least one chamber 78 and the chamber 78 is arranged to be supplied with a coolant.

It is to be noted that the first portion 72, the second portion 74 and the third portion 76 of each segment 70 and 70' extends axially by the same axial distance and thus the whole of the axial length of the first portion 72 of each segment 70, 70' overlaps the whole of the axial length of the third portion 76 of an adjacent segment 70, 70'. Each segment 70, 70' may be arranged such that the segments 70, 70' have one or more steps axially along their length so as to progressively increase the volume of the annular combustion chamber 42 along its length in a downstream direction. Thus, the first and third portions 72 and 76 of the segments 70, 70' may have one or more steps axially along their length, with the steps in a radially outward direction for the segments 70 and in a radially inward direction for the segments 70. Each segment 70, 70' extends the full axial length of the annular combustion chamber 42 as shown in the figures, but it may be possible to have a plurality of rows of segments 70, 70' to form the full axial length of the annular combustion chamber 42.

In the case of the radially outer annular wall 46, the segments 70 are arranged such that the first portion 72 of each segment 70 is arranged radially outwardly of the third portion 76 of the adjacent segment 70. The third portion 76 of each segment 70 has at least one radially outwardly extending stud 80 arranged to locate in a corresponding aperture 82 in the first portion 72 of the adjacent segment 70 to join the segments 70 together. The third portion 76 of each segment 70 has a plurality of radially outwardly extending studs 80 arranged to locate in a corresponding aperture 82 of a plurality of apertures 82 in the first portion 72 of the adjacent segment 70 to join the segments 70 together. The studs 80 are threaded into nuts 84 at the radially outer surface 86 of the first portion 72 of the adjacent segment 70. In the case of the radially outer annular wall 46, the segments 70 are arranged such that the first portion 72 of each segment 70 is arranged to extend circumferentially through substantially the same angle as the third portion 76 of the adjacent segment 70. A small gap is provided between the second portion 74 of each segment 70 and the end of the third portion 76 remote from the second portion 74 of the adjacent segment 70 to allow for thermal expansion and there may be a flow of cooling air through this gap.

The second portion 74 of each segment 70 in fact extends circumferentially and radially. The first portion 72 of each segment 70 is spaced radially from the third portion 76 of the adjacent segment 70 to form at least one chamber 78 and the chamber 78 is arranged to be supplied with a coolant.

The first portion 72 of each segment 70 has at least one dilution aperture 62A aligned with a corresponding dilution aperture 62B in the third portion 76 of the adjacent segment 70. The first portion 72 of each segment 70 has a plurality of cooling holes 86 arranged to supply coolant to the at least one chamber 78 defined between the first portion 72 and the third portion 76 of the adjacent segments 70. The plurality of cooling holes 86 may be arranged to impinge the coolant upon a radially outer surface 88 of the third portion 76 of the adjacent segment 70. The third portion 76 of each segment 70 has a plurality of effusion cooling holes 90 to provide a film of coolant on a radially inner surface 92 of the third portion 76 of each segment 70. The third portion 76 of each segment 70 may have a thermal barrier coating 94 on the radially inner surface 92.

In addition radially outwardly extending pedestals may be provided on the third portions 76 of each segment 70.

In the case of the radially inner annular wall 44, the segments 70' are arranged such that the first portion 72 of each segment 70' is arranged radially inwardly of the third portion 76 of the adjacent segment 70'. The third portion 76 of each segment 70' has at least one radially inwardly extending stud 80 arranged to locate in a corresponding aperture 82 in the first portion 72 of the adjacent segment 70' to join the segments 70' together. The third portion 76 of each segment 70' has a plurality of radially inwardly extending studs 80 arranged to locate in a corresponding aperture 82 of a plurality of apertures 82 in the first portion 72 of the adjacent segment 70' to join the segments 70' together. The studs 80 are threaded into nuts 84 at the radially inner surface 86' of the first portion 72 of the adjacent segment 70'. In the case of the radially inner annular wall 44, the segments 70' are arranged such that the first portion 72 of each segment 70' is arranged to extend circumferentially through substantially the same angle as the third portion 76 of the adjacent segment 70'. A small gap is provided between the second portion 74 of each segment 70' and the end of the third portion 76 remote from the second portion 74 of the adjacent segment 70' to allow for thermal expansion and there may be a flow of cooling air through this gap.

The second portion 74 of each segment 70' in fact extends circumferentially and radially. The first portion 72 of each segment 70' is spaced radially from the third portion 76 of the adjacent segment 70' to form at least one chamber 78 and the chamber 78 is arranged to be supplied with a coolant.

The first portion 72 of each segment 70' has at least one dilution aperture 58A aligned with a corresponding dilution aperture 58B in the third portion 76 of the adjacent segment 70'. The first portion 72 of each segment 70' has a plurality of cooling holes 86 arranged to supply coolant to the at least one chamber 78 defined between the first portion 72 and the third portion 76 of the adjacent segments 70'. The plurality of cooling holes 86 are arranged to impinge the coolant upon a radially inner surface 88' of the third portion 76 of the adjacent segment 70'. The third portion 76 of each segment 70' has a plurality of effusion cooling holes 90' to provide a film of coolant on a radially outer surface 92' of the third portion 76 of each segment 70'. The third portion 76 of each segment 70' may have a thermal barrier coating 94 on a radially outer surface 92'. In addition radially inwardly extending pedestals may be provided on the third portions 76 of each segment 70'.

The first portion 72, the second portion 74 and the third portion 76 of each segment 70 or 70' is formed integrally. At least one of the segments 70 or 70' is a casting and formed by casting in a mould and in an example all of the segments 70 and 70' are metal castings. Alternatively at least one of the segments 70 or 70' is formed by direct laser deposition of a metal powder or selective laser sintering of a metal powder and in a further example all of the segments are formed by direct laser deposition of a metal powder or selective laser sintering of a metal powder. The segments 70 and 70' may be formed by other suitable methods.

The radially outer annular wall 46 and the radially inner annular wall 44 may be bolted to the upstream end wall 48. In the figures the second portions 74 of the segments 70 and 70' have been described as extending radially and circumferentially, however, the second portions 74 may extend simply radially.

Thus all the segments may be identical and the first and third portions extend circumferentially through the same angle such that each segment defines a sector with a predetermined angle. For example there may be two, three, four, six, eight or twelve or other suitable numbers of segments defining a half, a third, a quarter, a sixth or a twelfth of the combustion chamber. Alternatively, the segments may be different with adjacent segments arranged such that the first portion of a first segment extends circumferentially through the same angle as the third portion of a second adjacent segment but the first portion of each segment extends circumferentially through a different angle to the third portion of that segment.

The advantage of the present invention is that it allows the combustion chamber to be manufactured simply by bolting together a plurality of segments together, e.g. bolting a kit of parts together. The resulting combustion chamber is a double wall combustion chamber. The segments are simply cast from a suitable metal, or alloy, formed by direct laser deposition (OLD) of a powder metal, or alloy, or selective laser sintering of a powder metal, or alloy, for example a nickel base superalloy. The segments may be cast to provide one or more of the known cooling techniques, e.g. pedestals, turbulators, impingement cooling holes, effusion cooling holes. The segments of the combustor are replaceable in service without the need to use joining processes such as welding, brazing etc and damaged segments are simply un-bolted from the wall of the combustion chamber and a new, or replacement, segment is bolted into the wall of the combustion chamber. The present invention provides a combustion chamber in which one or more of the walls comprises a plurality of segments and each of the segments comprises a first portion which forms a portion of the cold wall of a double wall combustion chamber and a second portion which forms a portion of the hot wall of the double wall combustion chamber. The present invention enables the combustion chamber to be constructed from hand tools. There is a reduction in the lead time, a reduction in cost, no machine tools required, no forgings required, no sheet metal forming processes and repair is easier.

Although the present invention has been described with reference to an annular combustion chamber, the present invention is equally applicable to a tubular combustion chamber and the tubular wall of the tubular combustion chamber is formed from a plurality of segments as described above. In the case of an annular combustion chamber the radially inner annular wall and the radially outer annular wall are rings and define an annular combustion zone and in the case of a tubular combustion chamber the tubular wall is a ring and defines a cylindrical combustion zone.

Although the present invention has been described with reference to a gas turbine engine combustion chamber, the present invention is equally applicable to other types of combustion chambers.

The invention claimed is:

1. A combustion chamber comprising at least one annular wall, the annular wall comprising a plurality of segments, each segment having a first portion, a second portion and a third portion, the first portion of each segment extending circumferentially, the third portion of each segment extending circumferentially and the second portion of each segment extending radially to connect the first portion and third portion of the segment, the first portion of each segment being spaced radially from the third portion of the segment by the second portion, the segments being arranged such that the first portion of each segment overlaps the third portion of a circumferentially adjacent segment and the first portion of each segment is joined to the third portion of the adjacent segment.

2. The combustion chamber as claimed in claim 1 wherein the second portion of each segment extends circumferentially and radially.

3. The combustion chamber as claimed in claim 1 wherein the first portion of each segment is spaced radially from the third portion of the adjacent segment, and the first portion and the second portion of each segment, and the second portion and the third portion of the adjacent segment, form at least one chamber and the chamber is arranged to be supplied with a coolant.

4. The combustion chamber as claimed in claim 1 wherein the segment is arranged such that the first portion of each segment is arranged radially outwardly of the third portion of the adjacent segment.

5. The combustion chamber as claimed in claim 4 wherein the third portion of each segment has at least one radially outwardly extending stud arranged to locate in a corresponding aperture in the first portion of the adjacent segment to join the segments together.

6. The combustion chamber as claimed in claim 5 wherein the third portion of each segment has a plurality of radially outwardly extending studs arranged to locate in a corresponding aperture of a plurality of apertures in the first portion of the adjacent segment to join the segments together.

7. The combustion chamber as claimed in claim 1 wherein the first portion of each segment has at least one dilution aperture aligned with a corresponding dilution aperture in the third portion of the adjacent segment.

8. The combustion chamber as claimed in claim 3 wherein the first portion of each segment has a plurality of cooling holes arranged to supply coolant to the at least one chamber defined between the first portion and the third portion of the adjacent segment.

9. The combustion chamber as claimed in claim 8 wherein the plurality of cooling holes are arranged to impinge the coolant upon a radially outer surface of the third portion of the adjacent segment.

10. The combustion chamber as claimed in claim 3 wherein the third portion of each segment has a plurality of effusion cooling apertures to provide a film of coolant on a radially inner surface of the third portion of each segment.

11. The combustion chamber as claimed in claim 3 wherein the third portion of each segment has a thermal barrier coating on a radially inner surface.

12. The combustion chamber as claimed in claim 1 wherein the segment is arranged such that the first portion of each segment is arranged radially inwardly of the third portion of the adjacent segment.

13. The combustion chamber as claimed in claim 12 wherein the third portion of each segment has at least one radially inwardly extending stud arranged to locate in a corresponding aperture in the first portion of the adjacent segment to join the segments together.

14. The combustion chamber as claimed in claim 13 wherein the third portion of each segment has a plurality of radially inwardly extending studs arranged to locate in a corresponding aperture of a plurality of apertures in the first portion of the adjacent segment to join the segments together.

15. The combustion chamber as claimed in claim 12 wherein the first portion of each segment has at least one dilution aperture aligned with a corresponding dilution aperture in the third portion of the adjacent segment.

16. The combustion chamber as claimed in claim 12 wherein the first portion of each segment has a plurality of cooling holes arranged to supply coolant to the at least one chamber defined between the first portion and the third portion of the adjacent segment.

17. The combustion chamber as claimed in claim 16 wherein the plurality of cooling holes are arranged to impinge the coolant upon a radially inner surface of the third portion of the adjacent segment.

18. The combustion chamber as claimed in claim 12 wherein the third portion of each segment has a plurality of effusion cooling apertures to provide a film of coolant on a radially outer surface of the third portion of each segment.

19. The combustion chamber as claimed in claim 12 wherein the third portion of each segment has a thermal barrier coating on a radially outer surface.

20. The combustion chamber as claimed in claim 1 wherein the first portion, the second portion and the third portion of each segment is formed integrally.

21. The combustion chamber as claimed in claim 20 wherein at least one of the segments comprises a casting.

22. The combustion chamber as claimed in claim 1 wherein the combustion chamber is a tubular combustion chamber and the at least one wall is a tubular wall.

23. The combustion chamber as claimed in claim 1 wherein the combustion chamber is an annular combustion chamber and the at least one wall is selected from the group consisting of a radially outer annular wall and a radially inner annular wall.

24. A combustion chamber comprising at least one annular wall, the annular wall comprising a plurality of segments, each segment having a first portion, a second portion and a third portion, the first portion of each segment extending circumferentially, the third portion of each segment extending circumferentially and the second portion of each segment extending radially to connect the first portion and third portion of the segment, the first portion of each segment being spaced radially from the third portion of the segment by the second portion, the segments being arranged such that the first portion of each segment overlaps the third portion of a circumferentially adjacent segment and the first portion of each segment is joined to the third portion of the adjacent segment, the first portion of each segment being arranged to extend circumferentially through substantially the same angle as the third portion of the adjacent segment, wherein the at least one annular wall comprises a double wall annular wall comprising a cold wall and a hot wall, the first portion of each segment forming a portion of the cold wall of the double wall annular wall and the third portion of each segment forming a portion of the hot wall of the double annular wall.

25. A combustion chamber comprising at least one annular wall, the annular wall comprising a plurality of segments, each segment having a first portion, a second portion and a third portion, the first portion of each segment extending circumferentially, the third portion of each segment extending circumferentially and the second portion of each segment extending radially to connect the first portion and third portion of the segment, the first portion of each segment being spaced radially from the third portion of the segment by the second portion, the segments being arranged such that the first portion of each segment overlaps the third portion of a circumferentially adjacent segment and the first portion of each segment is joined to the third portion of the adjacent segment, the first portion of each segment being arranged to extend axially substantially the same length as the third portion of the adjacent segment, the first portion, the second portion, and the third portion of each segment extending axially by the same axial distance, wherein the at least one annular wall comprises a double wall annular wall comprising a cold wall and a hot wall, the first portion of each segment forming a portion of the cold wall of the double wall annular wall and the third portion of each segment forming a portion of the hot wall of the double wall annular wall.

26. A combustion chamber comprising at least one annular wall, the annular wall comprising a plurality of segments, each segment having a first portion, a second portion and a third portion, the first portion of each segment extending circumferentially, the third portion of each segment extending circumferentially and the second portion of each segment extending radially to connect the first portion and third portion of the segment, the first portion and the third portion of each segment extending in opposite circumferential directions from the second portion of the segment, the first portion of each segment being spaced radially from the third portion of the segment by the second portion, the segments being arranged such that the first portion of each segment overlaps the third portion of a circumferentially adjacent segment and the first portion of each segment is joined to the third portion of the adjacent segment.

* * * * *